Oct. 18, 1960 E. J. VAN LARE 2,956,881
HEMIOXONOL DYES CONTAINING A CARBOCYCLIC NUCLEUS
AND PHOTOGRAPHIC EMULSIONS CONTAINING THEM
Filed March 12, 1957

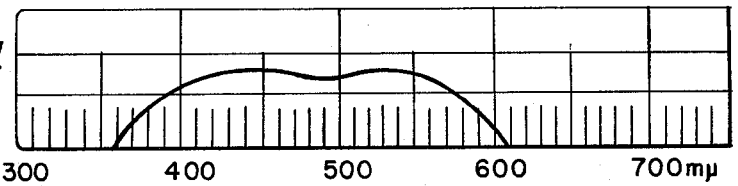

*Fig.1*

1,3- DIETHYL- 5- [3,5-NEOPENTYLENE-5-(1-PIPERIDYL)-
2,4- PENTADIENYLIDENE] -2- THIOBARBITURIC ACID

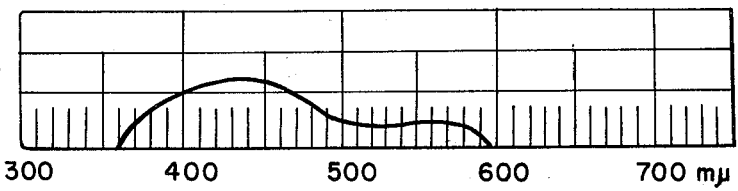

*Fig.2*

1,3- DIETHYL-5-[5-(4- MORPHOLINYL)-3,5-NEOPENTYLENE-
2,4- PENTADIENYLIDENE]-2- THIOBARBITURIC ACID

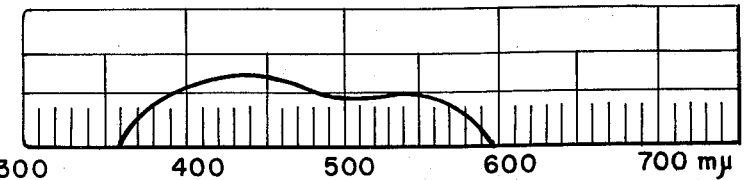

*Fig.3*

1,3 - DIETHYL-5- [3,5- NEOPENTYLENE-5- (1-PYRROLIDYL)-
2,4- PENTADIENYLIDENE] -2- THIOBARBITURIC ACID

*Earl J.Van Lare*
INVENTOR.

BY
ATTORNEYS

2,956,881

HEMIOXONOL DYES CONTAINING A CARBOCYCLIC NUCLEUS AND PHOTOGRAPHIC EMULSIONS CONTAINING THEM

Earl J. Van Lare, Rochester, N.Y., assignor to Eastman Kodak Company, Rochester, N.Y., a corporation of New Jersey Filed Mar. 12, 1957, Ser. No. 645,415

11 Claims. (Cl. 96—102)

This invention relates to certain hemioxonol dyes containing a carbocyclic nucleus and a method for making these new dyes. The hemioxonol dyes produced according to my invention can be employed in spectrally sensitizing photographic silver halide emulsions.

It, is therefore, an object of my invention to provide new hemioxonol dyes. Another object is to provide a method for making these hemioxonol dyes. Still another object is to provide photographic silver halide emulsions spectrally sensitized with the new hemioxonol dyes of my invention. A further object is to provide a method for making these spectrally sensitized photographic silver halide emulsions. Other objects will become apparent from a consideration of the following description and examples.

The sensitizing effect of the new dyes of my invention are graphically illustrated in the accompanying drawing, where Figures 1 to 3 represent diagrammatic reproductions of wedge spectrograms of photographic silver halide emulsions sensitized with one of my new dyes.

The new hemioxonol dyes of my invention can advantageously be represented by the following general formula:

I.
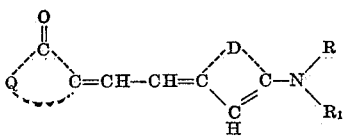

wherein R and R1 each represents an alkyl group (e.g., methyl, ethyl, n-propyl, n-butyl, isobutyl, β-hydroxyethyl, etc., especially an alkyl group containing from 1 to 4 carbon atoms), or an aryl group (e.g., phenyl, tolyl, etc., especially a monocyclic aryl group of the benzene series containing from 6 to 7 carbon atoms), or R and R₁ together represent the non-metallic atoms necessary to complete a heterocyclic nucleus containing from 5 to 6 atoms in the heterocyclic ring (e.g., pyrrolidine, piperidine, morpholine, decahydroquinoline, indoline, etc., especially an hydrogenated azole or azine nucleus), D represents the atoms necessary to complete a cyclohexene ring and Q represents the non-metallic atoms necessary to complete a nucleus of the indandione series (e.g., 1,3-diketo-hydrindene, etc.) or a heterocyclic nucleus containing from 5 to 6 atoms in the heterocyclic ring, such as those of the pyrazolinone series (e.g., 3-methyl-1-phenyl-5-pyrazolinone, 1-phenyl-5-pyrazolinone, 1-(2-benzothiazolyl)- 3-methyl-5-pyrazolinone, etc.), those of the isoxazolinone series (e.g., 3-phenyl-5(4H)-isoxazolinone, 3-methyl-5 (4H)-isoxazolinone, etc.), those of the oxindole series, e.g., 1-alkyl-2,3-dihydro-2-oxindoles, etc.), those of the 2,4,6-triketohexahydropyrimidine series (e.g., barbituric acid or 2-thiobarbituric acid, as well as their 1-alkyl (e.g., 1-methyl, 1-ethyl, 1-n-propyl, 1-n-heptyl, etc.), or 1,3-dialkyl (e.g., 1,3-dimethyl, 1,3-diethyl, 1,3-di-n-propyl, 1,3-diisopropyl, 1,3-dicyclohexyl, 1,3-di(β-methoxyethyl), etc.), or 1,3-diaryl (e.g., 1,3-diphenyl, 1,3-di(p-chlorophenyl), 1,3-di(p-ethoxycarbonylphenyl), etc.), or 1-aryl (e.g., 1-phenyl, 1-p-chlorophenyl, 1-p-ethoxycarbonylphenyl), etc.) or 1-alkyl-3-aryl (e.g., 1-ethyl-3-phenyl, 1-n-heptyl-3-phenyl, etc.) derivatives), those of the rhodanine series (i.e., 2-thio-2,4-thiazolidinedione series), such as rhodanine, 3-alkylrhodanines (e.g., 3-ethylrhodanine, 3-allylrhodanine, etc.) or 3-arylrhodanines (e.g., 3-phenylrhodanine, etc.), etc., those of the 2-thio-2,4-oxazolidinedione series (i.e., those of the 2-thio-2,4(3H, 5H)-oxazoledione series) (e.g., 3-ethyl-2-thio-2,4-oxazolidinedione, etc.), those of the thianaphthenone series (e.g., 3(2H)-thianaphthenone, etc.), those of the 2-thio-2,5-thiazolidinedione series (i.e., the 2-thio-2,5(3H,4H)-thiazoledione series) (e.g., 3-ethyl-2-thio-2,5-thiazolidinedione, etc.), those of the 2,4-thiazolidinedione series (e.g., 2,4-thiazolidinedione, 3-ethyl-2,4-thiazolidinedione, 3-phenyl-2,4-thiazolidinedione, 3-α-naphthyl - 2,4 - thiazolidinedione, etc.), those of the thiazolidinone series (e.g., 4-thiazolidinone, 3-ethyl-4-thiazolidinone, 3-phenyl-4-idinedione, etc.), those of the thiazolidione series (e.g., thiazolidinone, 3-α-naphthyl-4-thiazolidinone, etc.), those of the 4-thiazolinone series (e.g., 2-ethylmercapto-4-thiazolinone, 2-alkylphenylamino-4-thiazolinones, 2-diphenylamino-4-thiazolinone, etc.), those of the 2-imino-2,4-oxazolinone (i.e., pseudohydantoin) series, those of the 2,4-imidazolinedione (hydantoin) series, e.g., 2,4-imidazolinedione, 3-ethyl-2,4-imidazolinedione, 3-phenyl-2,4-imidazolinedione, 3-α-naphthyl - 2,4 - imidazolinedione, 1,3-diethyl-2,4-imidazolinedione, 1-ethyl-3-α-naphthyl-2,4-imidazolinedione, 1,3 - diphenyl-2,4-imidazolinedione, etc.), those of the 2-thio-2,4-imidazolinedione (i.e., 2-thiohydantoin) series (e.g., 2-thio-2,4-imidazolinedione, 3-ethyl-2-thio-2,4-imidazolinedione, 3-phenyl-2 - thio-2,4-imidazolinedione, 3-α-naphthyl - 2-thio-2,4-imidazolinedione, 1,3 - diethyl - 2 - thio-2,4-imidazolinedione, 1-ethyl-3 - phenyl - 2 - thio - 2,4 - imidazolinedione, 1 - ethyl - 3-α-naphthyl-2-thio - 2,4 - imidazolinedione, 1,3-diphenyl-2-thio-2,4-imidazolinedione, etc.), those of the 5-imidazolinone series (e.g., 2-n-propylmercapto-5-imidazolinone, etc.), etc. (especially a heterocyclic nucleus containing 5 atoms in the heterocyclic ring, 3 of said atoms being carbon atoms, 1 of said atoms being a nitrogen atom, and 1 of said atoms being selected from the group consisting of a nitrogen atom, an oxygen atom, and a sulfur atom).

The compounds of Formula I above can advantageously be prepared by condensing together a compound selected from those represented by the following general formula:

II.
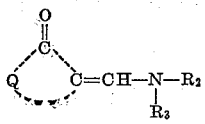

wherein Q has the values given above, and R₂ represents an acyl group (e.g., acetyl, propionyl, butyryl, benzoyl, etc.), and R₃ represents an aryl group (e.g., phenyl, tolyl, etc.), with a compound selected from those represented by the following general formula:

III.
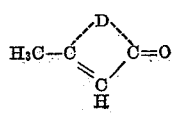

wherein D has the values given above, together with a secondary amine selected from those represented by the following general formula:

IV.

wherein R and R₁ each have the values given above.

Heat accelerates the condensations, although temperatures varying from about 50° C. to the reflux temperature of the reaction mixture acn conveniently be employed.

Especially useful ketone compounds embraced by Formula III above which have been found useful in my invention comprise those represented by the following general formula:

V.

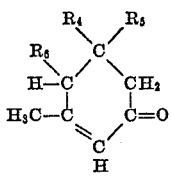

wherein $R_4$ and $R_5$ each represents a hydrogen atom or a lower alkyl group, such as methyl, ethyl, etc., and $R_6$ represents a hydrogen atom or a carbalkoxyl group, such as carbomethoxyl, carbethoxyl, etc. (e.g., a carbaloxyl group containing from 2 to 3 carbon atoms). Typical of such ketone compounds are isophorone, 3,5-dimethyl-2-cyclohexen-1-one, 3-methyl-2-cyclohexen-1-one, 4-carbethoxy-3-methyl-2-cyclohexen-1-one, etc.

Use of the intermediates of Formula V above in my invention provides dyes represented by the following general formula:

Ia.

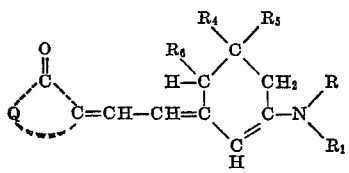

wherein R, $R_1$, $R_4$, $R_5$, $R_6$ and Q each have the values given above.

If desired, the condensations of my invention can conveniently be carried out in the presence of an inert diluent. However, many of the ingredients employed in these condensations are liquid at ordinary temperatures and an inert diluent is not needed. Typical inert diluents include ethanol, dioxane, chloroform, etc.

The following examples will serve to illustrate more fully the manner of practicing my invention.

EXAMPLE 1

*1,3 - diethyl - 5 - [3,5 - neopentylene - 5 - (1 - piperidyl)- 2,4-pentadienylidene]-2-thiobarbituric acid*

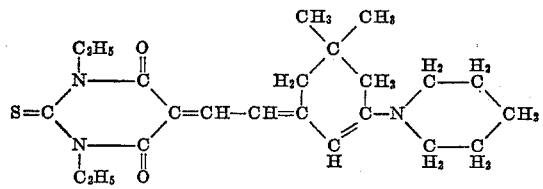

A mixture of 5-aminomethylene-1,3-diethyl-2-thiobarbituric acid (9.1 g., 1 mol.), isophorone (11.5 g., 1 mol. plus 100% excess) and piperidine (4 cc., 1 mol. plus 10% excess) was refluxed for 10 minutes. After chilling, the reaction mixture was filtered and the solid was washed with ethyl alcohol. After two recrystallizations from methyl alcohol, lustrous blue crystals were obtained in a 29% yield, M.P. 200–202° C. dec., and they sensitized a gelatino-silver-bromoiodide emulsion to about 605 mu with maximum sensitivity at about 560 mu.

*Analysis.*—Calculated for $C_{23}H_{33}N_3O_2S$: C, 66.47; H, 8.00. Found: C, 66.2; H, 7.8.

EXAMPLE 2

*1,3 - diethyl - 5 - [5 - (4 - morpholinyl) - 3,5 - neopentylene - 2,4 - pentadienylidene] - 2 - thiobarbituric acid*

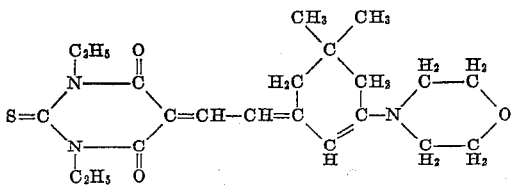

A mixture of 5-acetanilidomethylene-1,3-diethyl-2-thiobarbituric acid (3.45 g., 1 mol.), isophorone (1.38 g., 1 mol.) and morpholine (1 g., 1 mol. plus 10% excess) was refluxed gently for 15 minutes. The reaction mixture was diluted with 10 ml. of ethyl alcohol and chilled. The solid was filtered off and washed several times with ether to remove colorless impurities. After two recrystallizations from methyl alcohol, lustrous blue needles were obtained in a 12% yield, M.P. 247–248° C. dec., and they sensitized a gelatino-silver-bromoiodide emulsion to about 600 mu with maximum sensitivity at about 560 mu.

*Analysis.*—Calculated for $C_{22}H_{31}N_3O_3S$: C, 63.27; H, 7.48. Found: C, 63.1; H, 7.7.

EXAMPLE 3

*1,3 - diethyl - 5 - [3,5 - neopentylene - 5 - (1 - pyrrolidyl)- 2,4 - petadienylidene] - 2 - thiobarbituric acid*

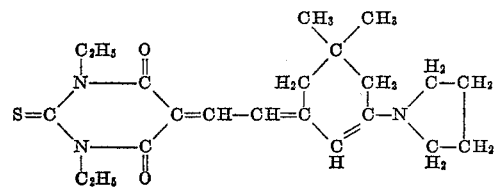

A mixture of 5-acetanilidomethylene-1,3-diethyl-2-thiobarbituric acid (3.45 g., 1 mol.), isophorone (1.38 g., 1 mol.) and pyrrolidine (0.85 g., 1 mol. plus 20% excess) was refluxed gently for 15 minutes. The reaction mixture was diluted with 10 ml. of ethyl alcohol and then chilled. The solid was filtered off and washed several times with ether to remove colorless impurities. After two recrystallizations from methyl alcohol, lustrous purple crystals were obtained in a 55% yield, M.P. 263–264° C. dec., and they sensitized a gelatino-silver-bromoiodide emulsion to about 595 mu with maximum sensitivity at about 550 mu.

*Analysis.*—Calculated for $C_{22}H_{31}N_3O_2S$: C, 65.80; H, 7.78. Found: C, 65.9; H, 8.2.

EXAMPLE 4

*5 - [5 - (1 - decahydroquinolyl) - 3,5 - neopentylene- 2,4 - pentadienylidene] - 1,3 - diethyl - 2 - thiobarbituric acid*

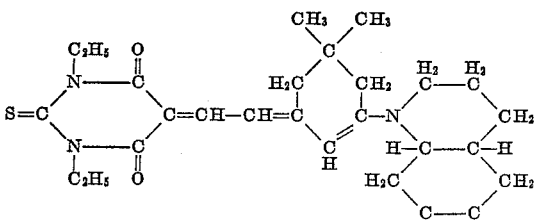

A mixture of 5-acetanilidomethylene-1,3-diethyl-2-thiobarbituric acid (3.45 g., 1 mol.), isophorone (1.38 g., 1 mol.) and decahydroquinoline (1.53 g., 1 mol. plus 10% excess) was refluxed gently for 15 minutes. Methyl alcohol was added to the reaction mixture and the dye was adsorbed on a column of 10 g. of decolorizing carbon (Norit). After washing with 1 liter of methyl alcohol and then with 3 liters of acetone, the dye was eluted with 500 ml. of pyridine. The pyridine solution was concentrated to a small volume, then treated with water, and the dye was filtered off. Fine dull red needles were obtained in a 6% yield, M.P. 118–121° C. dec., and they sensitized a gelatino-silver-bromoiodide emulsion to about 605 mu with maximum sensitivity at about 570 mu.

EXAMPLE 5

*1,3 - diethyl - 5 - [5 - (1 - indolinyl) - 3,5 - neopentylene-2,4 - pentadienylidene] - 2 - thiobarbituric acid*

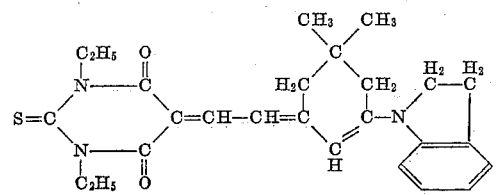

A mixture of 5-acetanilidomethylene-1,3-diethyl-2-thiobarbituric acid (3.45 g., 1 mol.), isophorone (1.38 g., 1 mol.) and indoline (1.43 g., 1 mol. plus 10% excess) was refluxed gently for 15 minutes. Ethyl alcohol (10 ml.) was added to the reaction mixture. After chilling a colorless solid was filtered off and washed with ethyl alcohol. The dye in the filtrate and washings was adsorbed on a column containing 10 gm. of decolorizing carbon (Norit). After washing with 2 liters of methyl alcohol and then 4 liters of acetone, the dye was eluted with 1 liter of pyridine. The pyridine solution was concentrated to nearly dryness and the residue dissolved in 15 ml. of ethyl alcohol, filtered and chilled. The dye was filtered off and washed with ethyl alcohol. Dull dark crystals were obtained in a 5% yield, M.P. 80–85° C., and they sensitized a gelatino-silver-bromoiodide emulsion to about 590 mu with maximum sensitivity at about 570 mu.

EXAMPLE 6

*1,3 - diethyl - 5 - [5 - di(β - hydroxyethyl)amino-3,5-neopentylene - 2,4 - pentadienylidene] - 2 - thiobarbituric acid*

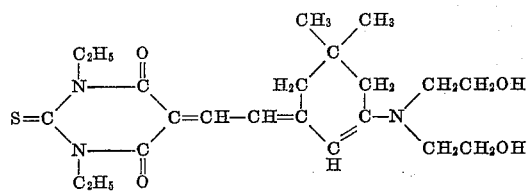

A mixture of 5-acetanilidomethylene-1,3-diethyl-2-thiobarbituric acid (3.45 g., 1 mol.), isophorone (1.38 g., 1 mol.) and diethanolamine (1.25 g., 1 mol. plus 20% excess) was refluxed gently for 15 minutes. Ethyl alcohol (10 ml.) was added to the reaction mixture. After chilling, a pink solid was filtered off and washed with ethyl alcohol. The filtrate and washings were combined and treated with an equal volume of water. After boiling for a short time, the dye separated. The mixture was chilled and the dye was filtered off and washed with water. The solid was extracted several times with ether to remove colorless impurities. After recrystallization from ethyl alcohol, dark lustrous crystals were obtained in a 3% yield, M.P. 258–259° C. dec., and they sensitized a gelatino-silver-bromoiodide emulsion to about 590 mu with maximum sensitivity at about 550 mu.

EXAMPLE 7

*3 - ethyl - 5 - [3,5 - neopentylene - 5 - (1 - piperidyl)-2,4-pentadienylidene]rhodanine*

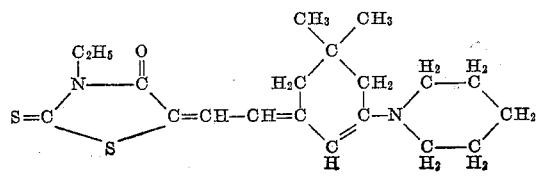

A mixture of 5-acetanilidomethylene-3-ethylrhodanine (3.06 g., 1 mol.), isophorone (1.38 g., 1 mol.) and piperidine (1.1 ml., 1 mol. plus 10% excess) was refluxed gently for 5 minutes. Ethyl alcohol (20 ml.) was added to the reaction mixture and the dye was adsorbed on a column of 15 g. of decolorizing carbon (Norit). After washing with 1 liter of methyl alcohol and then with 4 liters of acetone, the dye was eluted with 1 liter of pyridine. The pyridine solution was filtered and concentrated to a very small volume and then treated with water. The dye was filtered off and washed with water. Fine bronze crystals were obtained in a 3% yield, M.P. 95–98° C., and they sensitized a gelatino-silver-bromoiodide emulsion from about 570 mu to 670 mu with maximum sensitivity at about 635 mu.

EXAMPLE 8

*3 - ethyl - 5 - [3,5 - neopentylene - 5 - (1 - pyrrolidyl)-2,4-pentadienylidene]rhodanine*

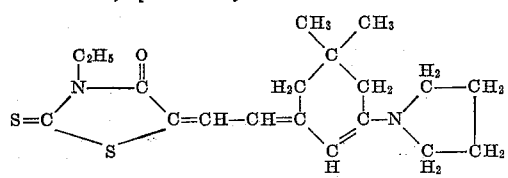

A mixture of 5-acetanilidomethylene-3-ethylrhodanine (3.06 g., 1 mol.), isophorone (1.38 g., 1 mol.) and pyrrolidine (0.85 g., 1 mol. plus 20% excess) was refluxed gently for 10 minutes. The reaction mixture was diluted with 10 ml. of ethyl alcohol and chilled. The solid was filtered off and washed with ethyl alcohol. After two recrystallizations from methyl alcohol, lustrous steely plates were obtained in a 42% yield, M.P. 138–140° C. dec., and they sensitized a gelatino-silver-bromoiodide emulsion from about 550 mu to about 665 mu with maximum sensitivity at about 635 mu.

EXAMPLE 9

*4 - [3,5 - neopentylene - 5 - (1 - pyrrolidyl) - 2,4 - pentadienylidene]-3-phenyl-2-isoxazolin-5-one*

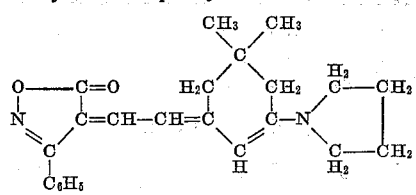

A mixture of 4-acetanilidomethylene-3-phenyl-2-isoxazolin-5-one (3.2 g., 1 mol.), isophorone (1.38 g., 1 mol.) and pyrrolidine (0.85 g., 1 mol. plus 20% excess) was refluxed gently for 15 minutes. The reaction mixture was diluted with 10 ml. of ethyl alcohol and then chilled. The solid was filtered off and washed thoroughly with ether. After two recrystallizations from methyl alcohol, beautiful crystals with a purplish-blue reflex were obtained in an 18% yield, M.P. 258–259° C. dec., and they sensitized a gelatino-silver-bromoiodide emulsion to about 560 mu.

*Analysis.*—Calculated for $C_{23}H_{26}N_2O_2$: C, 76.21; H, 7.23. Found: C, 76.4; H, 7.3.

EXAMPLE 10

*3 - methyl - 4 - [3,5 - neopentylene - 5 - (1 - pyrrolidyl)-pentadienylidene]-1-phenyl-2-pyrazolin-5-one*

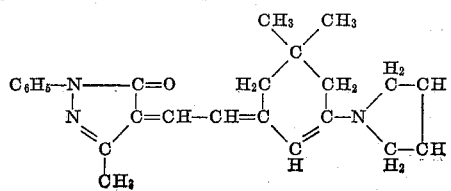

A mixture of 4-acetanilidomethylene-3-methyl-1-phenyl-2-pyrazolin-5-one (3.32 g., 1 mol.), isophorone (1.38 g., 1 mol.) and pyrrolidine (0.85 g., 1 mol. plus 20% excess) was refluxed gently for 15 minutes. The reaction mixture was diluted with 10 ml. of ethyl alcohol and then chilled. The solid was filtered off, washed well with ether and dried. After two recrystallizations from ethyl alcohol, fine green crystals were obtained in a 36% yield, M.P. 235–236° C. dec., and they sensitized a gelatino-silver-bromoiodide emulsion to about 580 mu with maximum sensitivity at about 550 mu.

Analysis.—Calculated for $C_{24}H_{29}N_3O$: C, 76.78; H, 7.79. Found: C, 77.0; H, 7.6.

EXAMPLE 11

*1,3 - diethyl - 5 - (5 - di - n - propylamino - 3,5 - neopentylene - 2,4 -pentadienylidene) - 2 - thiobarbituric acid*

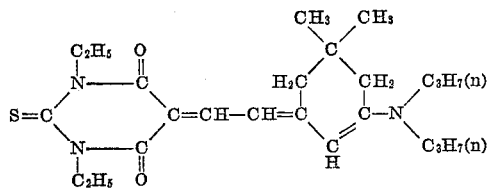

A mixture of 5-acetanilidomethylene-1,3-diethyl-2-thiobarbituric acid (3.45 g., 1 mol.), isophorone (1.38 g., 1 mol.) and di-n-propylamine (1.2 g., 1 mol. plus 20% excess) was refluxed gently for 15 minutes. Ethyl alcohol (10 ml.) was added to the reaction mixture and the solution chilled. The solid was filtered off and washed with ethyl alcohol. The colorless solid was discarded. The dye in the filtrate and washings was adsorbed on a column containing 10 grams of decolorizing carbon (Norit). After washing with 2 liters of methyl alcohol and then with 1 liter of acetone, the dye was eluted with 500 ml. of pyridine. The pyridine solution was concentrated to nearly dryness and the residue stirred with 15 ml. of water. After stirring for a short while, the dye became crystalline. It was filtered off and washed with water. Dull reddish crystals were obtained in an 11% yield, M.P. 89–91° C.

EXAMPLE 12

*1,3 - diethyl - 5 - [3,5 - (2-methyltrimethylene) - 5 - (1-pyrrolidyl) - 2,4 - pentadienylidene] - 2 - thiobarbituric acid*

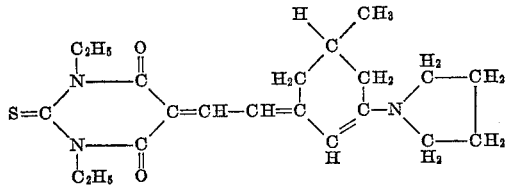

A mixture of 5-acetanilidomethylene-1,3-diethyl-2-thiobarbituric acid (3.45 g., 1 mol.), 3,5-dimethyl-2-cyclohexenone (1.24 g., 1 mol.) and pyrrolidine (0.85 g., 1 mol. plus 20% excess) was refluxed gently for 15 minutes. Ethyl alcohol (10 ml.) was added to the reaction mixture and, after chilling, the solid was filtered off and washed with ethyl alcohol. The solid was dissolved in pyridine and the solution diluted with methyl alcohol. The solid was filtered off and washed with alcohol. The solid was discarded. The dye in the filtrates and washings was adsorbed on a column containing 15 grams of decolorizing carbon (Norit). After washing with 2 liters of methyl alcohol and then with 1½ liters of acetone, the dye was eluted with 750 ml. of pyridine. The pyridine solution was concentrated to near-dryness and the residue stirred with water. After stirring for a short while, the dye became crystalline. It was filtered off and washed with water. After recrystallization from methyl alcohol, dark blue crystals were obtained in an 8% yield, M.P. 238–239° C. dec.

EXAMPLE 13

*1,3-diethyl-5-[5-(1-pyrrolidyl) - 3,5 - trimethylene - 2,4-pentadienylidene]-2-thiobarbituric acid*

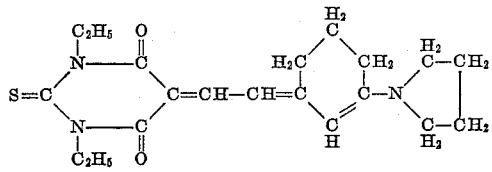

A mixture of 5-acetanilidomethylene-1,3-diethyl-2-thiobarbituric acid (3.45 g., 1 mol.), 3-methyl-2-cyclohexenone (1.1 g., 1 mol.) and pyrrolidine (0.85 g., 1 mol. plus 20% excess) was gently refluxed for 15 minutes. Ethyl alcohol (10 ml.) was added to the reaction mixture. After chilling, the solid was filtered off and washed with ethyl alcohol. The solid was dissolved in 300 ml. of methyl alcohol, and, after filtering, the solution was concentrated to 100 ml. The solid, which separated from the solution on chilling, was filtered off and washed lightly with methyl alcohol and discarded. The filtrate and washings was concentrated to 15 ml. and the solution chilled. The solid, which had separated, was filtered off and washed with a little ethyl alcohol. This solid was quite impure. The filtrate was diluted with 10 ml. of ethyl alcohol and chilled. The dye, which separated, was filtered off and washed with ethyl alcohol. Reddish crystals were obtained in a 3% yield, M.P. 225–226° C.

Instead of using a cyclic intermediate of the type represented by Formula II, it is possible to use related compounds of the type known as open-chain acylanilidomethylene compounds. The use of open-chain compounds analogous to those of Formula II provides compounds represented by the following general formula:

VI.

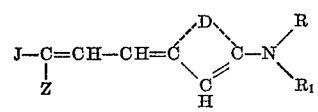

wherein R, $R_1$ and D each have the values given above, J represents a cyano group, a carboxyl group, a carbalkoxyl group (e.g., a carbomethoxyl group, a carbethoxyl group, etc.), a carboxylic acyl group (e.g., acetyl, propionyl, etc.), a carbamyl group, or a heterocyclic nucleus of the quinoline series (e.g., a 2- or a 4-quinolyl group), and Z represents an acyl group, such as acetyl, propionyl, carbamyl, and especially a heterocyclyl acyl group, such as 2-benzofurylcarbonyl, etc. Z can also represent a cyano group when J also represents a cyano group or when J represents a carbalkoxyl group.

The following examples will serve to illustrate the preparation of the dyes represented by Formula VI above.

EXAMPLE 14

*2-[2-cyano-5,7-neopentylene-7 - (1 - pyrrolidyl) - 2,4,6-heptatrienoxyl]benzofuran*

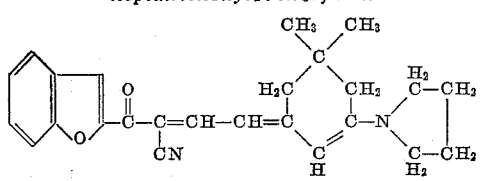

A mixture of 2-(acetanilidomethylenecyanoacetyl)-benzofuran (1.5 g., 1 mol.), isophorone (0.62 g., 1 mol.) and pyrrolidine (0.38 g., 1 mol. plus 20% excess) was refluxed gently for 15 minutes. The reaction mixture was diluted with 20 ml. of ethyl alcohol and the dye was adsorbed on a column containing 10 grams of decolorizing carbon (Norit). After washing with 3 liters of methyl alcohol, then with 5 liters of acetone and finally with 100 ml. of pyridine, the dye was eluted with 1 liter of pyridine. The pyridine solution was concentrated to a very small volume and the residue recrystallized from 15 ml. of ethyl alcohol. Dark brown needles were obtained in a 4% yield, M.P. 239–240° C. dec., and they sensitized a gelatino-silver-bromoiodide emulsion to about 635 mu with maximum sensitivity at about 620 mu.

EXAMPLE 15

[3,5-neopentylene-5-(1 - pyrrolidyl) - 2,4 - pentadienylidene]-malononitrile

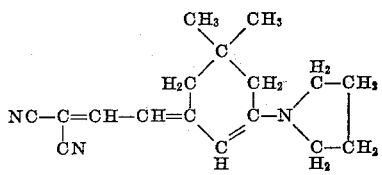

A mixture of acetanilidomethylenemalononitrile (2.25 g., 1 mol.), isophorone (1.38 g., 1 mol.) and pyrrolidine (0.85 g., 1 mol. plus 20% excess) was refluxed gently for 15 minutes. The reaction mixture was diluted with 20 ml. of ethyl alcohol and the dye was adsorbed on a column containing 10 grams of decolorizing carbon (Norit). After washing with 3 liters of methyl alcohol and then with 6 liters of acetone, the dye was eluted with 700 ml. of pyridine. The pyridine solution was concentrated to a very small volume and the residue was recrystallized from ethyl alcohol. Dull brown crystals were obtained in a 2% yield, M.P. 197–198° C., and they sensitized a gelatino-silver-bromoiodide emulsion to about 570 mu with maximum sensitivity at about 530 mu.

Many of the dyes of my invention are particularly useful in manufacturing photographic silver halide emulsions, serving to alter the sensitivity thereof. Sensitization by means of my new dyes is, of course, directed primarily to the ordinarily employed, gelatino-silver-halide, developing-out emulsions. The dyes are advantageously incorporated in the washed, finished emulsion and should, of course, be uniformly distributed throughout the emulsion. In the preparation of photographic emulsions containing my new dyes, it is only necessary to disperse the dyes in the emulsions. The methods of incorporating dyes in emulsion are simple and well known to those skilled in the art of emulsion making. It is convenient to add the dyes from solutions in appropriate solvents. The solvent must, of course, be compatible with the emulsion and substantially free from any deleterious effect on the light-sensitive materials. Pyridine has proven satisfactory as a solvent for the majority of my new dyes.

The concentration of my new dyes in the emulsion can vary widely, i.e., from about 5 to about 100 mgs. per liter of flowable emulsion. The concentration of the dye will vary according to the type of light-sensitive material in the emulsion and according to the effects desired. The suitable and most economical concentration for any given emulsion will be apparent to those skilled in the art upon making the ordinary tests and observations customarily used in the art of emulsion making.

To prepare a gelatino-silver-halide emulsion sensitized with one of my new dyes, the following procedure is satisfactory: A quantity of the dye is dissolved in pyridine or other suitable solvent and a volume of this solution (which may be diluted with methanol) containing from 5 to 100 mgs. of dye is slowly added to about 1000 cc. of a gelatino-silver-halide emulsion, with stirring. Stirring is continued until the dye is uniformly distributed throughout the emulsion. With most of my new dyes, 10 to 20 mgs. of dye per liter of emulsion suffices to produce the maximum sensitizing effect with the ordinary gelatino-silver-bromide (including bromiodide) emulsions. With fine-grain emulsions, which include most of the ordinarily employed gelatino-silver-chloride emulsions, somewhat larger concentrations of dye may be necessary to secure the optimum sensitizing effect.

The above statements are only illustrative and are not to be understood as limiting my invention in any sense, as it will be apparent that my new dyes can be incorporated by other methods in many of the photographic silver halide emulsions customarily employed in the art. For instance, the dyes can be incorporated by bathing a plate or film upon which an emulsion has been coated, in the solution of the dye, in an appropriate solvent. Bathing methods, however, are not to be preferred ordinarily.

Photographic silver halide emulsions which can advantageously be sensitized by means of the new dyes of my invention comprise the customarily employed gelatino-silver-chloride, gelatino-silver-chlorobromide, gelatino-silver-bromide, and gelatino-silver-bromoiodide developing-out emulsions.

Photographic silver halide emulsions, such as those listed above, containing the sensitizing dyes of my invention can also contain such addenda as chemical sensitizers, e.g., sulfur sensitizers (e.g., allyl thiocarbamide, thiourea, allylisothiocyanate, cystine, etc.), various gold compounds (e.g., potassium chloroaurate, auric trichloride, etc.) (see U.S. Patents 2,540,085; 2,597,856 and 2,597,915), various palladium compounds, such as palladium chloride (U.S. 2,540,086), potassium chloropalladate (U.S. 2,598,079), etc., or mixtures of such sensitizers; anti-foggants, such as ammonium chloroplatinate (U.S. 2,566,245), ammonium chloroplatinite (U.S. 2,566,263), benzotriazole, nitrobenzimidazole, 5-nitroindazole, benzidine, mercaptans, etc. (see Mees, "The Theory of the Photographic Process," MacMillan Pub., page 460), or mixtures thereof; hardeners, such as formaldehyde (U.S. 1,763,533), chrome alum (U.S. 1,763,533), glyoxal (U.S. 1,870,354), dibromacrolein (Br. 406,750), etc.; color couplers, such as those described in U.S. Patent 2,423,730, Spence and Carroll U.S. Patent 2,640,776, etc.; or mixtures of such addenda. Dispersing agents for color couplers, such as those set forth in U.S. Patents 2,322,027 and 2,304,940, can also be employed in the above-described emulsions.

My invention is further illustrated in the accompanying drawing where the curves in each of the three figures represents the sensitivity of an ordinary photographic silver halide emulsion sensitized with one of my new dyes.

In Figure 1, the solid curve represents the sensitivity of an ordinary photographic silver bromiodide emulsion sensitized with 1,3 - diethyl - 5-[3,5-neopentylene-5-(1-piperidyl) - 2,4 - pentadienylidene]-2-thiobarbituric acid. The preparation of this dye is given in Example 1 above.

In Figure 2, the solid curve represents the sensitivity of an ordinary photographic silver bromiodide emulsion sensitized with 1,3-diethyl-5-[5-(4-morpholinyl)-3,5-neopentylene - 2,4 - pentadienylidene] - 2-thiobarbituric acid. The preparation of this dye is given in Example 2 above.

In Figure 3, the solid curve represents the sensitivity of an ordinary photographic silver bromiodide emulsion sensitized with 1,3-diethyl-5-[3,5-neopentylene-5-(1-pyrrolidyl)-2,4-pentadienylidene]-2-thiobarbituric acid. The preparation of this dye is given in Example 3 above.

What I claim as my invention and desire secured by Letters Patent of the United States is:

1. A photographic silver halide emulsion sensitized with a hemioxonol dye selected from those represented by the following general formula:

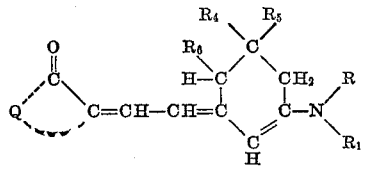

wherein R and R₁ together represent the non-metallic atoms necessary to complete a heterocyclic ring selected from the class consisting of a pyrrolidine ring, a piperidine ring, a morpholine ring, a decahydroquinoline ring and an indoline ring, $R_4$ and $R_5$ each represents a member selected from the class consisting of a hydrogen atom and a lower alkyl group, $R_6$ represents a member selected from the class consisting of a hydrogen atom and a carbalkoxyl group containing from 2 to 3 carbon atoms and Q represents the non-metallic atoms necessary to complete a heterocyclic nucleus selected from the class consisting of those of the pyrazolinone series, those of the isoxazolinone series, those of the oxindole series, those of the 2,4,6-triketohexahydropyrimidine series, those of the rhodanine series, those of the 2-thio-2,4-oxazolidinedione series, those of the thianaphthenone series, those of the 2-thio-2,5-thiazolidinedione series, those of the 2,4-thiazolidinedione series, those of the thiazolidinone series, those of the 4-thiazolinone series, those of the 2-imino-2,4-oxazolinone series, those of the 2,4-imidazolinedione series, those of the 2-thio-2,4-imidazolinedione series and those of the 5-imidazolinone series.

2. A photographic silver halide emulsion sensitized with a hemioxonol dye selected from those represented by the following general formula:

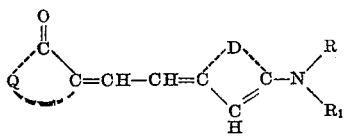

wherein R and R₁ together represent the non-metallic atoms necessary to complete a morpholine nucleus, D represents the atoms necessary to complete a cyclohexene ring and Q represents the non-metallic atoms necessary to complete a heterocyclic nucleus of the 2-thiobarbituric acid series.

3. A photographic silver halide emulsion sensitized with the hemioxonol dye represented by the following formula:

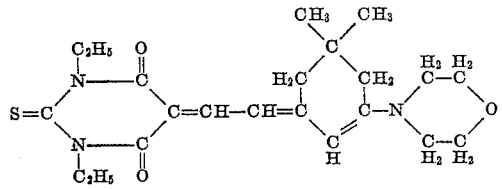

4. A photographic silver halide emulsion sensitized with a hemioxonol dye selected from those represented by the following general formula:

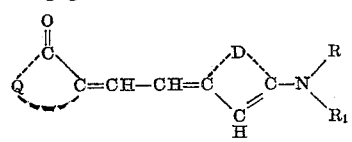

wherein R and R₁ together represent the non-metallic atoms necessary to complete a piperidine nucleus, D represents the atoms necessary to complete a cyclohexene ring and Q represents the non-metallic atoms necessary to complete a heterocyclic nucleus of the 2-thiobarbituric acid series.

5. A photographic silver halide emulsion sensitized with the hemioxonol dye represented by the following formula:

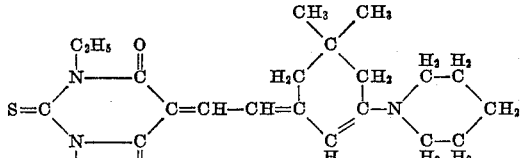

6. A photographic silver halide emulsion sensitized with a hemioxonol dye selected from those represented by the following general formula:

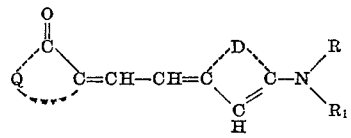

wherein R and R₁ together represent the non-metallic atoms necessary to complete a pyrrolidine nucleus, D represents the atoms necessary to complete a cyclohexene ring and Q represents the non-metallic atoms necessary to complete a heterocyclic nucleus of the 2-thiobarbituric acid series.

7. A photographic silver halide emulsion sensitized with the hemioxonol dye represented by the following formula:

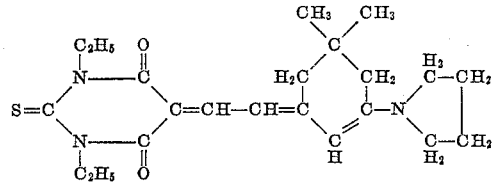

8. A photographic silver halide emulsion sensitized with a hemioxonol dye selected from those represented by the following general formula:

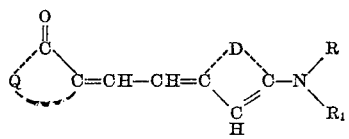

wherein R and R₁ together represent the non-metallic atoms necessary to complete a piperidine nucleus, D represents the atoms necessary to complete a cyclohexene ring, and Q represents the non-metallic atoms necessary to complete a heterocyclic nucleus of the rhodanine series.

9. A photographic silver halide emulsion sensitized with the hemioxonol dye represented by the following formula:

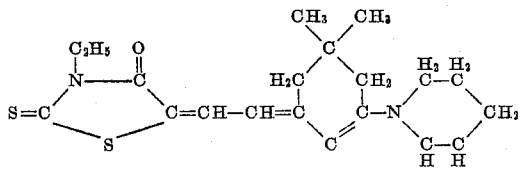

10. A photographic silver halide emulsion sensitized with a hemioxonol dye selected from those represented by the following general formula:

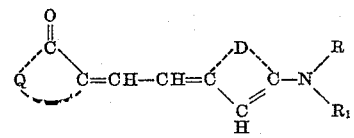

wherein R and R₁ together represent the non-metallic atoms necessary to complete a pyrrolidine nucleus, D represents the atoms necessary to complete a cyclohexene ring, and Q represents the non-metallic atoms necessary to complete a heterocyclic nucleus of the isoxazolinone series.

11. A photographic silver halide emulsion sensitized with the hemioxonol dye represented by the following formula:

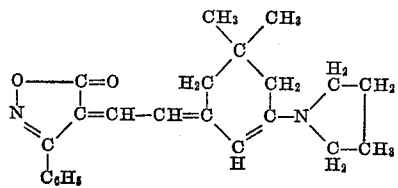

References Cited in the file of this patent

UNITED STATES PATENTS

| 2,186,608 | Keys | Jan. 9, 1940 |
| 2,216,441 | Keys | Oct. 1, 1940 |
| 2,340,882 | Kendall | Feb. 8, 1944 |
| 2,455,420 | Kendall | Dec. 7, 1949 |
| 2,734,900 | Heseltine | Feb. 14, 1956 |

OTHER REFERENCES

C.A., 16, 3101, Abstract of Brit. Med. Journal, 1922, I 514–5.

C.A., 19, 530, Abstract of Proc. Roy. Society, London, 96B, 317–33 (1924).